US011105241B2

(12) United States Patent
Tucker et al.

(10) Patent No.: US 11,105,241 B2
(45) Date of Patent: Aug. 31, 2021

(54) VENTURI STYLE INJECTOR CONE

(71) Applicant: Faurecia Emissions Control Technologies, USA, LLC, Columbus, IN (US)

(72) Inventors: Alfred N. Tucker, Columbus, IN (US); Tomasz Kozakeiwicz, Columbus, IN (US); Syed Saleem Quadri, Columbus, IN (US); Jeffery Prairie, Franklin, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/629,069

(22) PCT Filed: Aug. 30, 2017

(86) PCT No.: PCT/US2017/049255
§ 371 (c)(1),
(2) Date: Jan. 7, 2020

(87) PCT Pub. No.: WO2019/045701
PCT Pub. Date: Mar. 7, 2019

(65) Prior Publication Data
US 2020/0173330 A1 Jun. 4, 2020

(51) Int. Cl.
*F01N 3/20* (2006.01)
*F01N 3/28* (2006.01)
(Continued)

(52) U.S. Cl.
CPC ......... *F01N 3/2066* (2013.01); *F01N 3/2892* (2013.01); *B01F 3/04049* (2013.01);
(Continued)

(58) Field of Classification Search
CPC .......... B01F 2005/0091; B01F 3/04049; B01F 5/0473; B01F 5/0608; F01N 13/009;
(Continued)

(56) References Cited

U.S. PATENT DOCUMENTS 3,739,576 A * 6/1973 Chamberlain ............ F23R 3/10
60/738
4,388,045 A * 6/1983 Simon ........................ F04F 5/42
417/171

(Continued)

FOREIGN PATENT DOCUMENTS

CN    103184915 A    7/2013
CN    203452872 U    2/2014
(Continued)

OTHER PUBLICATIONS

International Preliminary Report on Patentability for PCT Application No. PCT/US2017/049255 dated Mar. 12, 2020.
(Continued)

*Primary Examiner* — Jesse S Bogue
(74) *Attorney, Agent, or Firm* — Carlson, Gaskey & Old, P.C.

(57) ABSTRACT

A vehicle exhaust system includes an injector assembly having a cone positioned adjacent to an injector mount and which extends from an upstream inlet end to a downstream outlet end. Engine exhaust gas and injected spray enter the inlet end of the cone to mix with each other prior to exiting the cone via the outlet end. The cone has a narrowing body portion located downstream of the inlet end to accelerate flow during mixing. A vehicle exhaust component assembly comprising a mixer with the injector assembly and a method for injecting a fluid into an exhaust component using the injector assembly are also disclosed.

20 Claims, 6 Drawing Sheets

(51) Int. Cl.
*B01F 3/04* (2006.01)
*B01F 5/00* (2006.01)
*F01N 3/021* (2006.01)

(52) U.S. Cl.
CPC ....... *B01F 2005/0091* (2013.01); *F01N 3/021* (2013.01); *F01N 2610/02* (2013.01); *F01N 2610/1453* (2013.01)

(58) Field of Classification Search
CPC ............. F01N 13/0097; F01N 2570/18; F01N 2610/02; F01N 2610/1453; F01N 3/021; F01N 3/103; F01N 3/2066; F01N 3/2892; Y02A 50/20; Y02T 10/12
See application file for complete search history.

(56) References Cited

U.S. PATENT DOCUMENTS

| | | | |
|---|---|---|---|
| 5,738,184 A | | 4/1998 | Masuda et al. |
| 6,722,123 B2* | | 4/2004 | Liu ...................... B01F 5/0616 60/286 |
| 8,756,921 B2* | | 6/2014 | Troxler ................. F01N 3/2066 60/295 |
| 9,103,258 B2* | | 8/2015 | Norling ..................... F01N 5/02 |
| 9,364,790 B2* | | 6/2016 | Sampath ............... B01F 5/0688 |
| 9,464,546 B2* | | 10/2016 | Perrot ................. B01F 3/04049 |
| 2005/0150211 A1* | | 7/2005 | Crawley ............... F01N 3/0256 60/282 |
| 2011/0094206 A1* | | 4/2011 | Liu ..................... B01F 3/04049 60/274 |
| 2011/0095105 A1 | | 4/2011 | Mortensen et al. |
| 2011/0308234 A1* | | 12/2011 | De Rudder ............... F01N 3/36 60/295 |
| 2013/0167516 A1* | | 7/2013 | Loman .................. B01F 5/0451 60/319 |
| 2016/0079829 A1 | | 3/2016 | Vera |
| 2016/0361694 A1* | | 12/2016 | Brandl ............... B01D 53/9431 |
| 2017/0082007 A1 | | 3/2017 | Alano et al. |

FOREIGN PATENT DOCUMENTS

| | | |
|---|---|---|
| CN | 206267925 U | 6/2017 |
| KR | 20160082444 A | 7/2016 |
| KR | 101662408 B1 | 10/2016 |
| WO | 2015187128 A1 | 12/2015 |

OTHER PUBLICATIONS

International Search Report and Written Opinion for PCT Application No. PCT/US2017/049255 dated May 28, 2018.
First Examination Report for Indian Patent Application No. 202017004800 dated Dec. 16, 2020.
Chinese Office Action dated Apr. 2, 2021 for CN Application No. 201780094325.2.

* cited by examiner

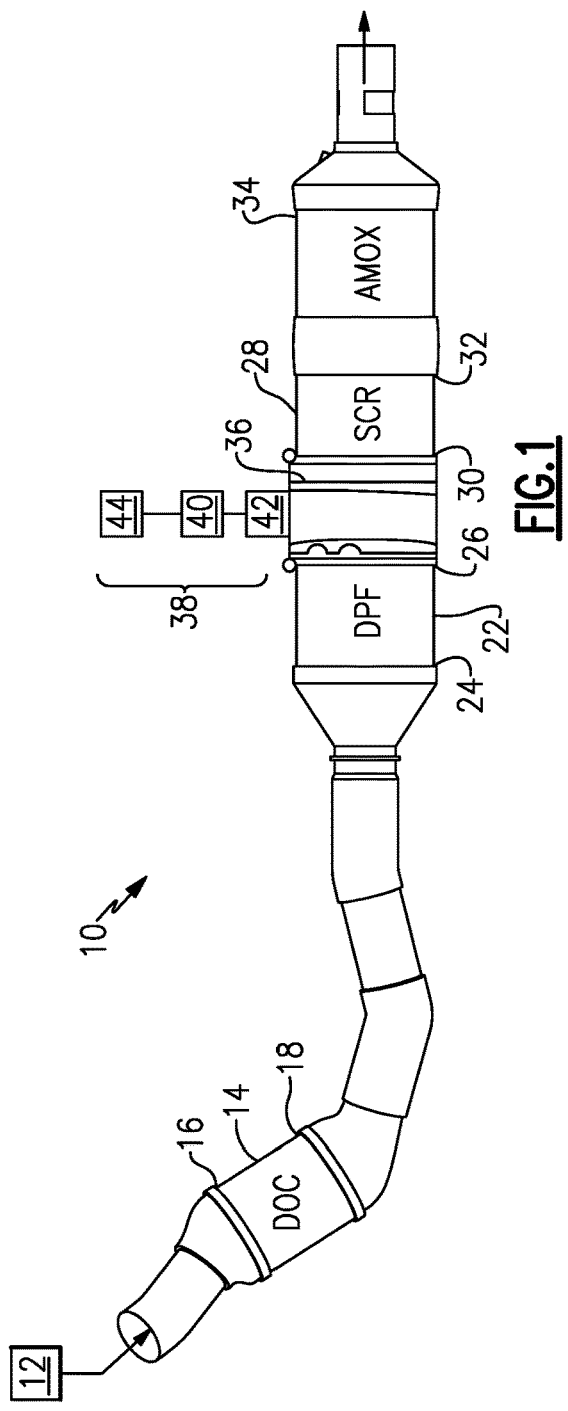
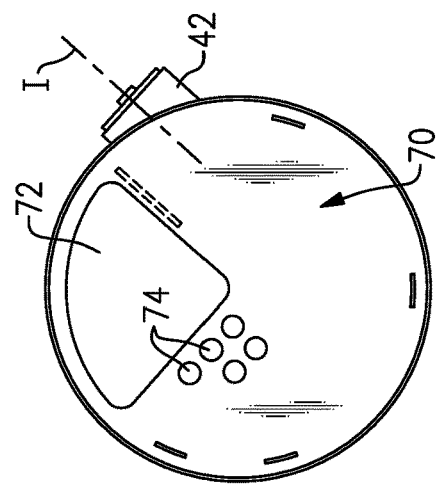
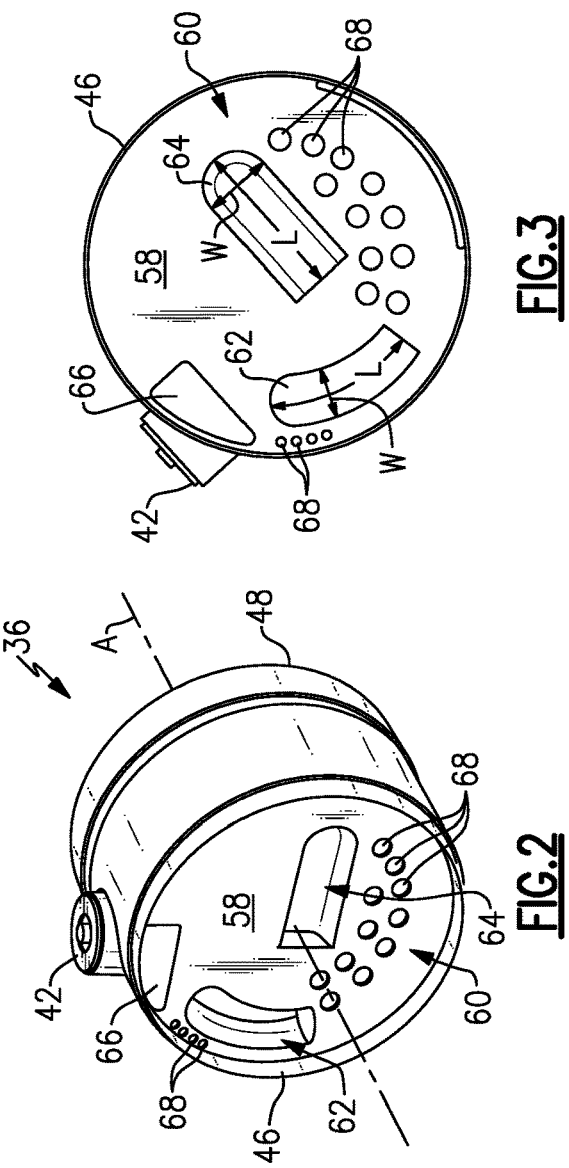
FIG.1
FIG.2
FIG.3
FIG.4

VENTURI STYLE INJECTOR CONE

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF), or a reducing agent such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixing area at the injection site, which creates deposit initiation sites along the walls. The deposits build up over time and can adversely affect system operation. For example, there may be a lower ammonia uniformity index, there may be an increased pressure drop across the mixer, or higher ammonia emissions during active diesel particulate filter (DPF) regeneration.

SUMMARY OF THE INVENTION

In one exemplary embodiment, a vehicle exhaust system includes an injector assembly with a cone positioned adjacent to an injector mount and which extends from an upstream inlet end to a downstream outlet end. Engine exhaust gas and injected spray enter the inlet end of the cone to mix with each other prior to exiting the cone via the outlet end. The cone has a narrowing body portion located downstream of the inlet end to accelerate flow during mixing.

In another exemplary embodiment, a vehicle exhaust component assembly comprises a mixer outer housing defining an internal cavity, an upstream baffle positioned within the internal cavity, and a downstream baffle positioned within the internal cavity and spaced axially from the upstream baffle in a direction along a mixer center axis. The assembly further includes an injector mount held fixed relative to the mixer outer housing, an injector mounted to the injector mount and configured to inject a fluid spray into the internal cavity, and a cone as described above.

In another exemplary embodiment, a method for injecting a fluid into an exhaust component includes the steps of: providing an injector to inject a fluid spray into an exhaust component; positioning a cone adjacent to the injector, the cone extending from an inlet end to an outlet end, and wherein engine exhaust gas and fluid spray from the injector enter the inlet end of the cone to mix with each other prior to exiting the cone via the outlet end; and forming a narrowing body portion in the cone at a location downstream of the inlet end to accelerate flow during mixing.

In a further embodiment of any of the above, the narrowing body portion is located at the outlet end.

In a further embodiment of any of the above, the narrowing body portion is located between the inlet and outlet ends such that the cone comprises a venturi shape.

In a further embodiment of any of the above, the cone comprises a body having a cone length extending from the upstream inlet end to the downstream outlet end, wherein the cone is defined by a first cross-sectional area at the inlet end and a second cross-sectional area along the cone length at a location that is downstream from the inlet end, and wherein the second cross-sectional area is less than the first cross-sectional area to define the narrowing body portion.

These and other features of this application will be best understood from the following specification and drawings, the following of which is a brief description.

BRIEF DESCRIPTION OF THE DRAWINGS

FIG. 1 schematically illustrates one example of an exhaust system with a mixer according to the subject invention.

FIG. 2 is a perspective view of an upstream end of one example of a mixer with an injection assembly that includes the subject invention.

FIG. 3 is an end view of an upstream end of the mixer of FIG. 2.

FIG. 4 is an end view of a downstream end of the mixer of FIG. 2.

DETAILED DESCRIPTION

Figure 5:
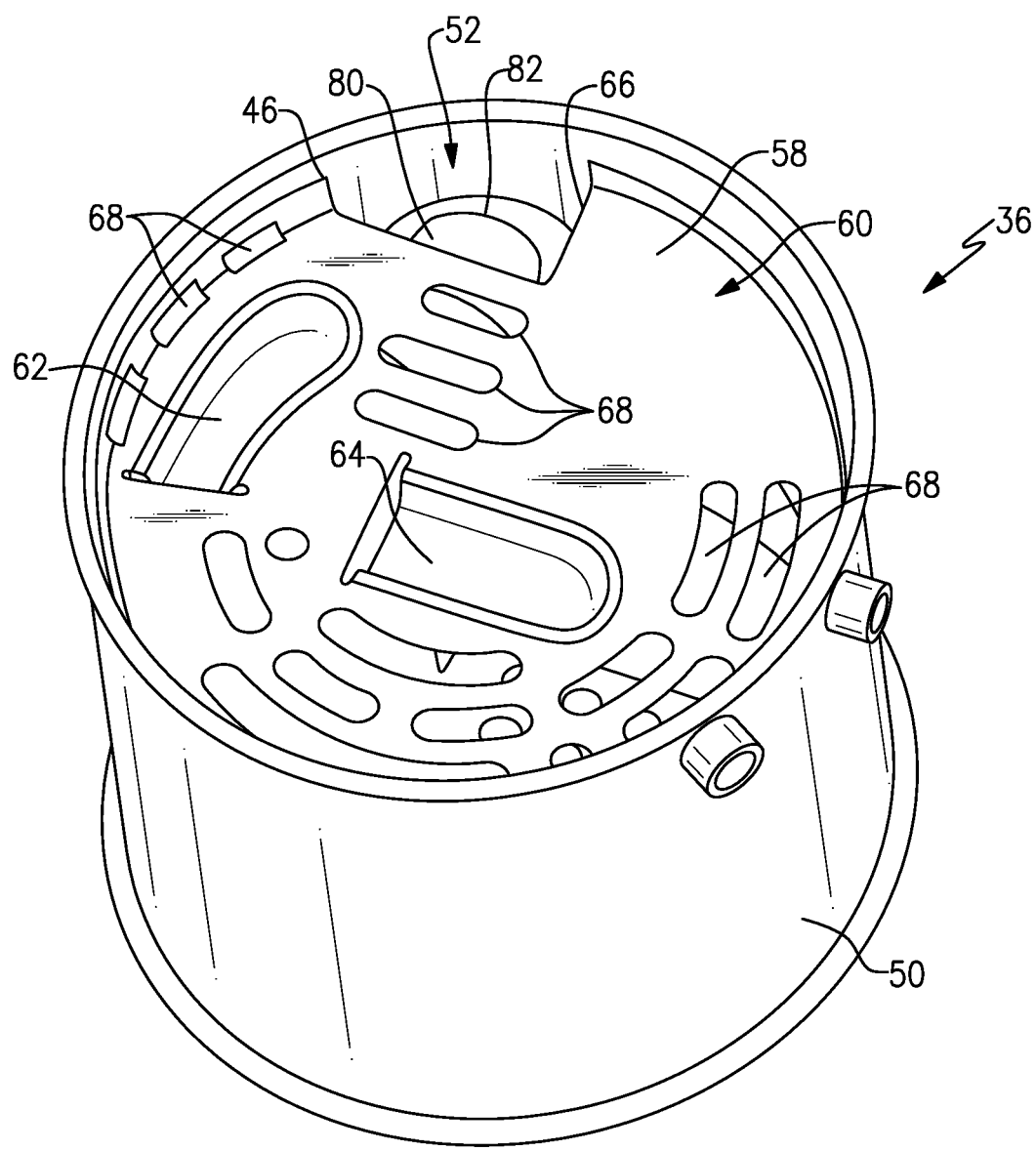
FIG. 5 is a perspective upstream end view of the mixer of FIG. 2.

FIG. 1 shows a vehicle exhaust system 10 that conducts hot exhaust gases generated by an engine 12 through various exhaust components to reduce emission and control noise as known. The various exhaust components can include one or more of the following: pipes, filters, valves, catalysts, mufflers etc. After passing though the various exhaust components, the engine exhaust gas exits the system 10 to atmosphere as known. As known, the vehicle exhaust components must be made from materials that can withstand high temperatures and corrosive operating conditions.

In one example configuration shown in FIG. 1, the exhaust components direct engine exhaust gases into a diesel oxidation catalyst (DOC) 14 having an inlet 16 and an outlet 18. Downstream of the DOC 14 there may be a diesel particulate filter (DPF) 22 that is used to remove contaminants from the exhaust gas as known. The DPF has an inlet 24 and an outlet 26. Downstream of the DOC 14 and optional DPF 22 is a selective catalytic reduction (SCR)

catalyst 28 having an inlet 30 and an outlet 32. The outlet 32 communicates exhaust gases to downstream exhaust components 34. Optionally, component 28 can comprise a catalyst that is configured to perform a selective catalytic reduction function and a particulate filter function. The various downstream exhaust components 34 can include one or more of the following: pipes, additional filters, valves, additional catalysts, mufflers etc. These exhaust components can be mounted in various different configurations and combinations dependent upon vehicle application and available packaging space.

A mixer 36 is positioned upstream of the inlet 30 of the SCR catalyst 28 and downstream from the outlet 18 of the DOC 14, or the outlet 26 of the DPF 22. The upstream catalyst and downstream catalyst can be arranged to be in-line, parallel, or angled relative to each other. The mixer 36 is used to generate a swirling or rotary motion of the exhaust gas. This will be discussed in greater detail below.

An injection system 38 is used to inject a fluid such as DEF or a reducing agent, such as a solution of urea and water for example, into the exhaust gas stream upstream from the SCR catalyst 28 such that the mixer 36 can mix the fluid and exhaust gas thoroughly together. The injection system 38 includes a fluid supply 40, a doser or injector 42, and a controller 44 that controls injection of the fluid as known.

The mixer 36 comprises a mixer body having an upstream or inlet end 46 configured to receive the engine exhaust gases and a downstream or outlet end 48 to direct a mixture of swirling engine exhaust gas and products transformed from urea to the SCR catalyst 22. Examples of a mixer that can be used in the exhaust system 10 can be found in US 2012/0216513 and co-pending U.S. application Ser. Nos. 12/576,93, 12/578,86, and 12/577,68 which are also assigned to the assignee of the present application and are hereby incorporated by reference. Other examples of mixers are found in PCT/US2017/019384, filed Feb. 24, 2017, and PCT/US2017/035130 filed May 31, 2017, which are also assigned to the assignee of the present application and are hereby incorporated by reference.

One example of a mixer 36 is shown in FIGS. 2-5. In this example, the mixer 36 defines a mixer center axis A and has the inlet end 46 configured to receive the engine exhaust gases from the outlet 26 of the DPF 22 or the outlet 18 of the DOC 14. The mixer 36 has the outlet end 48 to direct a mixture of swirling engine exhaust gas and products transformed from the injected fluid to the inlet 30 to the SCR catalyst 28. The mixer 36 includes an outer housing 50 (FIG. 5) that defines an internal cavity 52 that provides an engine exhaust gas flow path from the inlet end 46 to the outlet end 48.

The mixer 36 includes an inlet baffle 60 supported by the outer housing 50 adjacent to the inlet end 46. In this example, the inlet baffle 60 includes one or more elongated scoops 62, 64 that are used to direct engine exhaust gas into the internal cavity 52 to mix with spray injected by the injector 42. The scoops are arranged in a beneficial configuration on the inlet baffle 60 to control exhaust gas flow within the internal cavity 52 to improve performance and to minimize deposit formation on inner wall surfaces. The number of scoops can vary; however, the number of scoops is preferably no more than four. In one preferred configuration, the inlet baffle 60 includes only two scoops. In another example, the inlet baffle 60 may not include any scoops. This example will be discussed in greater detail below.

In one example configuration, the first scoop 62 and second scoop 64 are elongated such that each scoop 62, 64 has a scoop length L that is greater than a scoop width W. In one example, the inlet baffle 60 comprises a flat plate 58 having an upstream surface and a downstream surface that faces the internal cavity 52 with the scoops 62, 64 comprising recessed areas formed in the flat plate 58. Each scoop 62, 64 is open at one end to direct exhaust gas into the internal cavity 52.

The mixer 36 also includes an outlet baffle 70 through which a mixture of spray and exhaust gas exits the outlet end 48. In the example shown in FIG. 4, the outlet baffle 70 comprises a flat plate that includes a primary opening 72 through which a majority of a mixture of engine exhaust gas and spray exits the internal cavity 52 and a plurality of secondary openings 74 that are smaller than the primary opening 72. The secondary openings 74 help reduce back pressure and can be configured to have different shapes, sizes, and/or patterns in various combinations. Note that while flat plates are shown in the disclosed examples for the inlet 60 and outlet 70 baffles, it should be understood that a contoured or helical plate configuration could also be used. However, the flat plate configuration is preferred as it provides improved performance and is easier to manufacture.

In this example, the inlet baffle 60 also includes a primary opening 66 and a plurality of secondary openings 68. The primary opening 66 is positioned at a peripheral edge of the inlet baffle 60 and extends circumferentially along the edge for a desired distance to provide a sufficient size opening to direct a desired amount of exhaust gas into the internal cavity 52. The primary opening 66 is positioned near the injector 42 to direct exhaust gas toward an area where the spray is injected to the mixer 36. This will be discussed in greater detail below. The secondary openings 68 are smaller than the primary opening 66. The secondary openings 68 can be configured to have different shapes, sizes, and/or patterns in various combinations.

FIG. 5 shows an example of a mixer 36 that includes a cone 80 that surrounds spray injected by the injector 42. The injector 42 defines an injection axis I (FIG. 4) that extends transversely to the mixer center axis A (FIG. 2). A base end 82 of the cone 80 is positioned adjacent the inner surface of the housing 50 near the injector 42 such that an annular gap is formed at the base end 82. Exhaust gas is directed to enter the base end 82 of the cone 80 through the annular gap in a direction transverse to the injection axis I. As discussed above, the primary opening 66 of the inlet baffle 60 is positioned adjacent the injector 42. As shown in FIG. 5, in one example, the primary opening 66 is positioned to overlap the cone 80 such that exhaust gas is directed toward the inlet area of the cone 80 at the base end 82. In one example, the primary opening 66 has a triangular or wedge shape that is formed at the outer peripheral edge of the inlet baffle 60.

Figure 6:
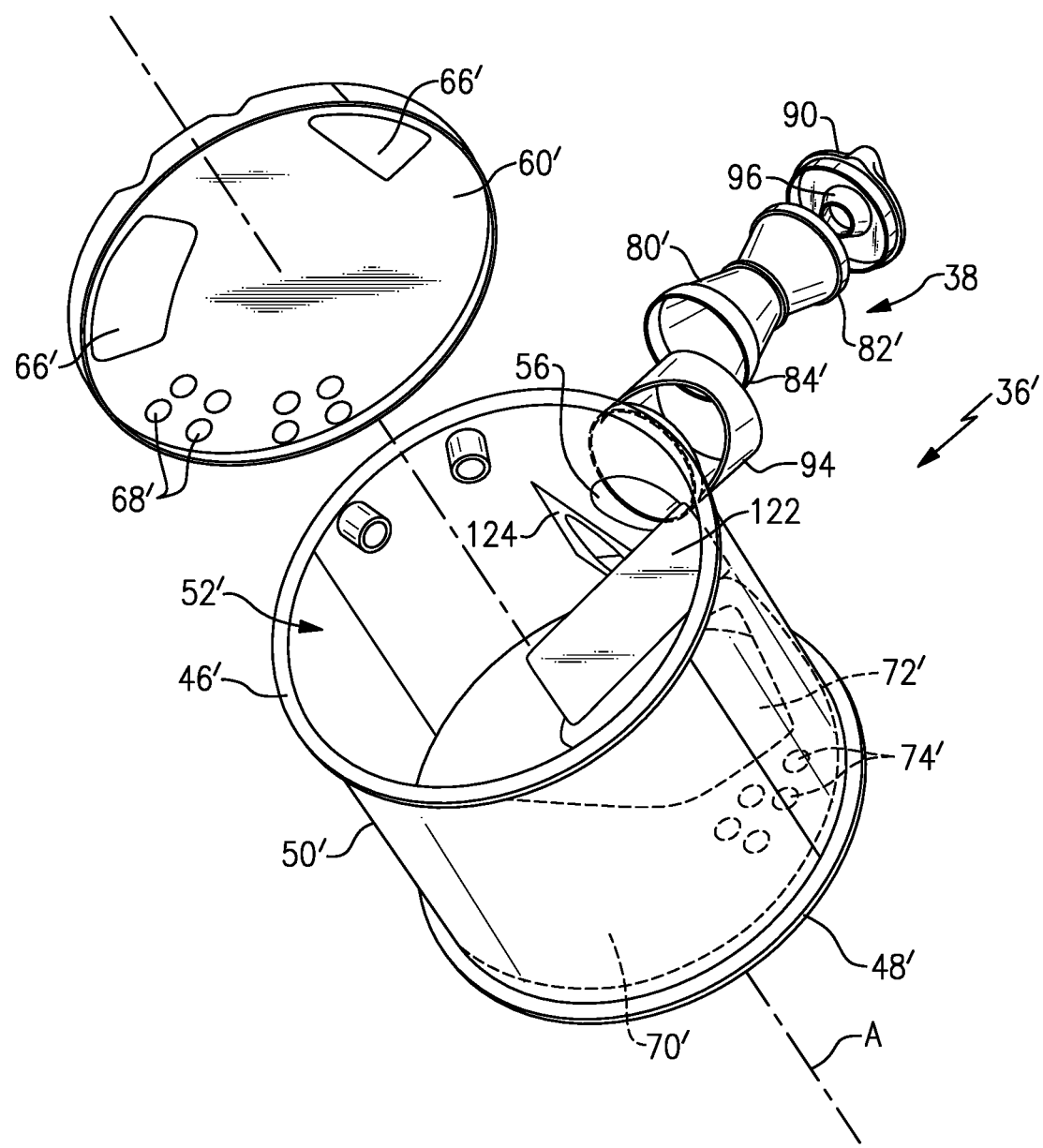
FIG. 6 is an exploded view of another example of a mixer with an injection assembly that includes the subject invention.
Figure 7:
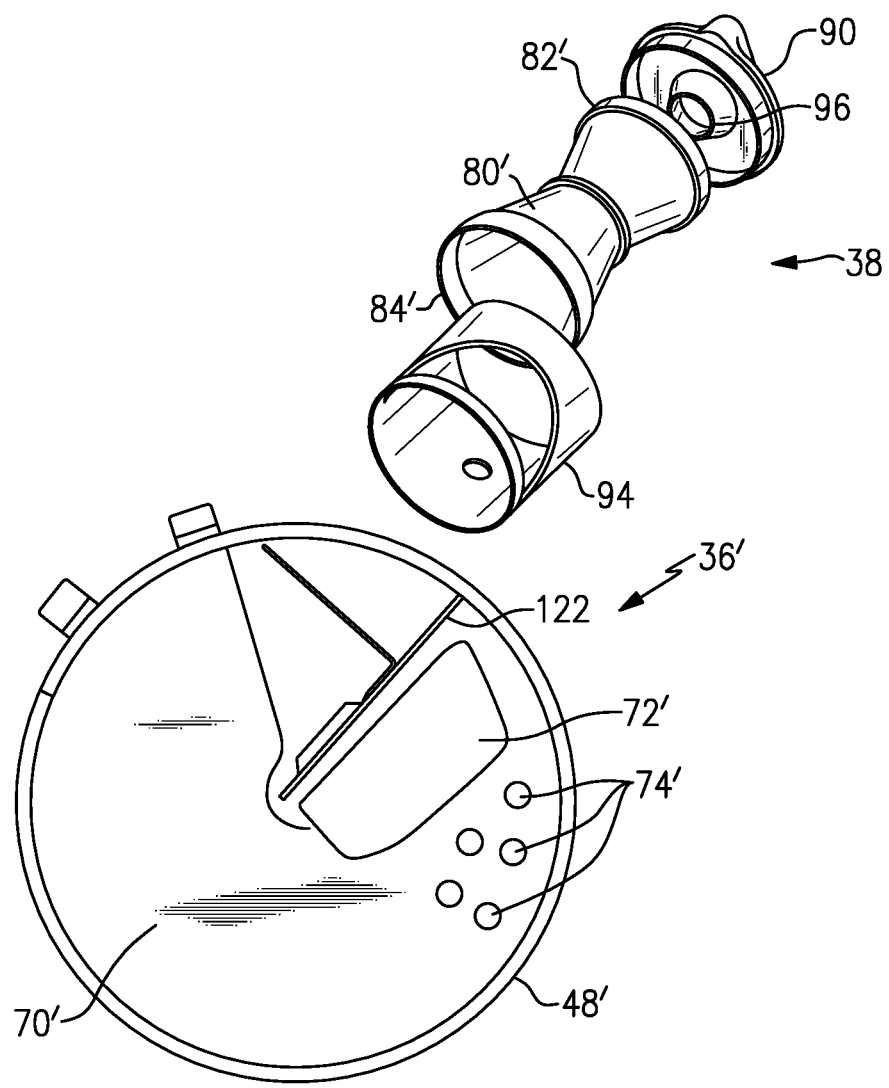
FIG. 7 is an exploded view of an injection assembly from the example of FIG. 6.

FIGS. 6-7 show another example of a mixer 36' that includes an outer shell or housing 50', an upstream or inlet baffle 60', and a downstream or outlet baffle 70'. The outer housing 50' defines a mixer central axis A that extends in a direction from the upstream end 46' to the downstream end 48'. The upstream baffle 60' is mounted within an internal cavity 52' of the outer housing 50' and includes one or more primary openings 66' through which a majority of flow of hot engine exhaust gases enter the mixer 36' and a plurality of secondary openings 68' that are smaller than the primary opening 66'. The downstream baffle 70' is mounted within the internal cavity 52' and includes a primary opening 72' through which a majority of a mixture of engine exhaust gas and spray exits the internal cavity 52' and a plurality of secondary openings 74' that are smaller than the primary opening 72'. The secondary openings 68', 74' operate to reduce back pressure as described above.

The injection system 38 is mounted at an opening 56 formed in an outer peripheral surface of the outer housing 50'. In one example configuration, the injection system 38 includes an injector mount 90 configured to mount the injector to the mixer 36', an injector cone 80', and an outer housing 94 that at least partially surrounds the injector cone 80'. The injector cone 80' is positioned within the internal cavity 52' at a position that is between the upstream 60' and downstream 70' baffles. The injector cone 80' extends from an inlet or base end 82' that receives exhaust gases to an outlet end 84'. Optionally, the injector mount 90 may include a spray protector 96 that extends axially from the injector mount 90.

Figure 8:
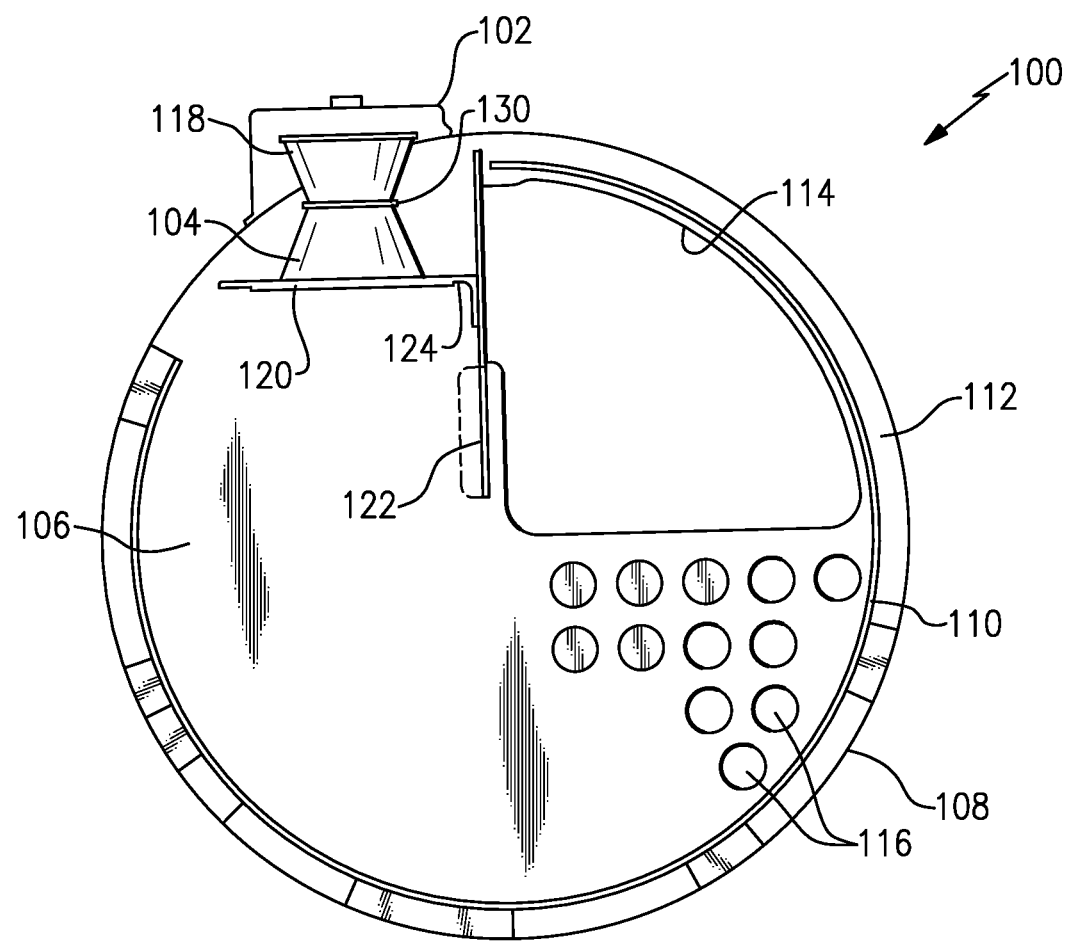
FIG. 8 is a downstream end view of a mixer with an injector cone that can be used with the mixers of FIG. 2 and FIG. 6.

In any of the examples disclosed above, the injector cone 80, 80' comprises an injector cone having an accelerating or venturi effect. This injector cone is shown in greater detail in FIGS. 8-9. FIG. 8 shows a mixer 100 including an injector mount 102 configured to mount the injector to the mixer 100, an injector cone 104, and an outlet baffle 106. The injector outer housing (94, for example in FIG. 6) and the upstream baffle are not shown in FIG. 8 for purposes of clarity. The mixer 100 includes an outer housing 108 and an inner wall 110 spaced radially inward of the outer housing 108 by a gap 112. The outlet baffle 106 includes one or more primary openings 114 and a plurality of secondary openings 116 that operate in a manner as described above.

As shown in FIG. 8, the injector cone 104 has an inlet end 118 that is positioned adjacent the injector mount 102. Exhaust gas is directed into the inlet end 118 of the injector cone 104 through a gap between the outer housing 108 and the inlet end 118 of the injector cone 104. The injector cone 104 has a body that extends from the inlet end 118 to an outlet end 120. A wall 122 is positioned adjacent an edge of the primary opening 114 of the outlet baffle 106 to prevent flow that exits the outlet end 120 of the cone 104 from immediately exiting the mixer 100 via the opening 114. The wall 122 comprises a flat sheet, radiused, curved, or other similar structure that extends along a majority, or an entirety, of the edge of the opening 114. A bracket or second wall 124 is mounted to support the injector cone 104 within the mixer 100. In one example the second wall 124 is adjacent to the outlet end 120 of the injector cone 104 and extends transversely relative to the first wall 122.

Figure 9:
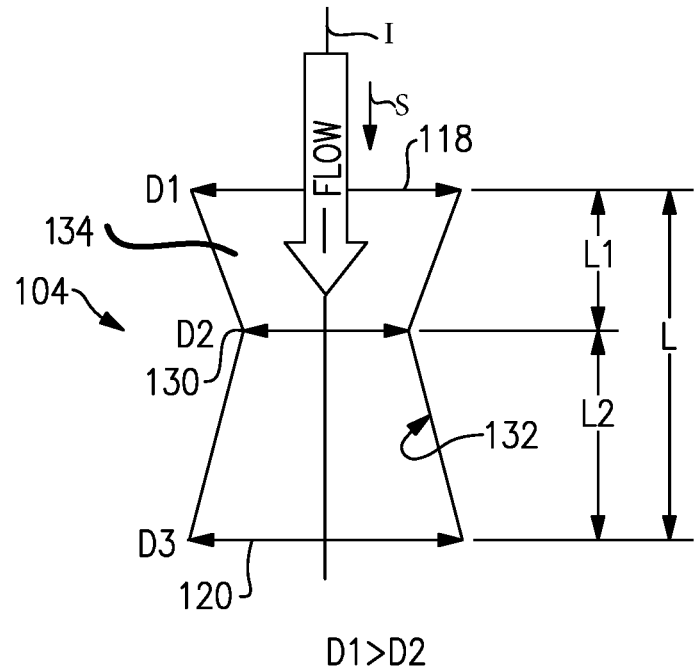
FIG. 9 is a schematic representation of the cone of FIG. 8.

As shown in FIG. 9, the cone 104 has a cone body that varies in cross-section from the upstream inlet end 118 to the downstream outlet end 120. As discussed above, engine exhaust gas and injected spray S enter the inlet end 118 of the cone 104 into cone internal open area at 134 to mix with each other prior to exiting the cone 104 via the outlet end 120. The cone 104 includes a narrowing body portion 130 located downstream of the inlet end 118 that is configured to accelerate flow during mixing.

The cone 104 has a cone length L extending from the upstream inlet end 118 to the downstream outlet end 120. The cone 104 has an overall L, a first cross-sectional area D1 at the inlet end 118, and a second cross-sectional area D2 at a location L1 that is downstream from the inlet end 118. The second cross-sectional area D2 is less than the first cross-sectional area D1 to define the narrowing body portion 130. The cone 104 includes an inner cone side wall surface 132 that defines the flow path through the cone 104. The narrowing body portion 130 facilitates the acceleration of flow during mixing and provides a more centralized flow mixture that exits the outlet end 120 such that the amount of spray that contacts the inner cone side wall surface 132 is significantly reduced.

In one preferred example, the cone 104 has a round cross-section such that the first cross-sectional area is defined is defined by a first diameter D1 and the second cross-sectional area is defined by a second diameter D2 that is less than the first diameter D1 to provide the narrowing body portion 130.

In the example shown in FIG. 9, the narrowing body portion 130 is located between the inlet 118 and outlet 120 ends such that the cone 104 comprises a venturi shape. A first length L1 is defined from the inlet end 118 to the narrowing body portion 130 and a second length L2 is defined from the narrowing body portion 130 to the outlet end 120. In one example, the second length L2 is greater than the first length L1. Optionally, the second length L2 can be less than or equal to the first length L1.

Also, in the example of FIG. 9, there is first cross-sectional area D1 at the inlet end 118, a second cross-sectional area D2 at the narrowing body portion 130, and a third cross-sectional area D3 at the outlet end 120. In this example, the second cross-sectional area D2 is less than the first cross-sectional area D1 and the third cross-sectional area D3 is greater than or equal to the second cross-sectional area D2. The third cross-section area D3 could also be equal to the first cross-sectional area D1.

Figure 10:
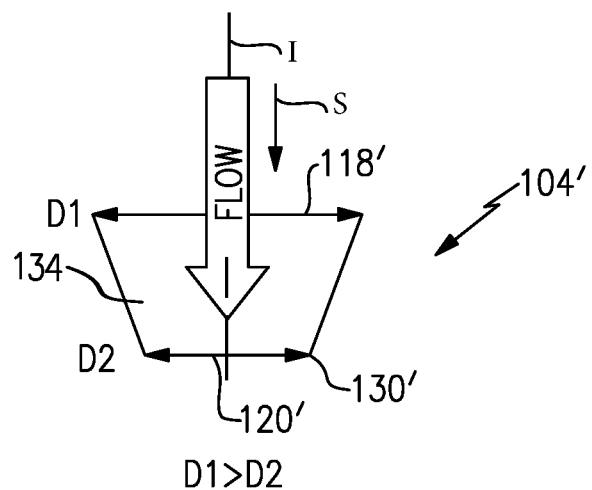
FIG. 10 a schematic representation of another example of a cone that can be used with the mixers of FIG. 2 and FIG. 6.

FIG. 10 shows another example of a cone 104' that extends from an inlet end 118' to an outlet end 120'. In this example, the narrowing body portion 130' is located at the outlet end 120'.

The subject injector cone with a narrowing body portion improves exhaust flow percentage within the cone, centralizes flow within the cone and mixer, and prevents the spray from impacting injector cone inner side wall surfaces. Flow from the exhaust must turn approximately 180 degrees in order to enter the cone inlet and then exit the cone outlet. Spray from the injector must transition from the tip, through the gap between the injector mount and the cone inlet, and then into the cone. The spray is mixed with the exhaust gas flow inside the cone as the spray travels through and exits the cone. The subject variable cross-section cone accelerates the exhaust flow as the flow passes through the narrowing body portion to reduce deposit formation. The subject cone also increases the percentage of exhaust flow through the cone, centralizes exiting flow, and decreases particle size of the spray when compared to traditional cones.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An injector assembly for an exhaust system comprising:
   an injection chamber positioned adjacent to an injector mount and extending from an upstream inlet end to a downstream outlet end that is open to a mixer chamber, the injection chamber having a variable cross-section, and wherein engine exhaust gas and injected spray enter the upstream inlet end of the injection chamber to mix with each other prior to exiting the injection chamber via the downstream outlet end, and wherein the injection chamber includes a narrowing body portion located downstream of the upstream inlet end to accelerate flow during mixing, and wherein the injected spray is configured to be injected in a first direction along an injection axis and a mixture of injected spray and engine exhaust gas exit the downstream outlet end in the first direction, and wherein the mixer chamber defines a center axis that is non-coaxial with the injection axis.

2. The injector assembly according to claim 1, wherein the injection chamber comprises a body having a length extending from the upstream inlet end to the downstream outlet end, wherein the injection chamber is defined by a first cross-sectional area at the upstream inlet end and a second cross-sectional area along the length at a location that is downstream from the upstream inlet end, and wherein the second cross-sectional area is less than the first cross-sectional area to define the narrowing body portion.

3. The injector assembly according to claim 2, wherein the first cross-sectional area is defined by a first diameter and the second cross-sectional area is defined by a second diameter that is less than the first diameter to provide the narrowing body portion that accelerates flow during mixing and provides a centralized exit flow mixture.

4. The injector assembly according to claim 3, wherein the second cross-sectional area is at the downstream outlet end.

5. The injector assembly according to claim 3, wherein the location of the second cross-sectional area is between the upstream inlet and downstream outlet ends such that the body comprises a venturi shape.

6. The injector assembly according to claim 1, wherein the narrowing body portion is located between the upstream inlet and downstream outlet ends such that the injection chamber comprises a venturi shape.

7. The injector assembly according to claim 6, wherein the injection chamber comprises a body having a length extending from the upstream inlet end to the downstream outlet end, and wherein a first length is defined from the upstream inlet end to the narrowing body portion and a second length is defined from the narrowing body portion to the downstream outlet end, and wherein the second length is greater than the first length.

8. The injector assembly according to claim 1, wherein the narrowing body portion is located at the downstream outlet end.

9. The injector assembly according to claim 1 wherein the injector mount is positioned adjacent the upstream inlet end and including an injector mounted to the injector mount to be coaxial with the injection chamber, and wherein the narrowing body portion provides a centralized exit flow mixture from the downstream outlet end of the injection chamber.

10. The injector assembly according to claim 9, wherein the injector mount is configured to be attached to a mixer housing defining an internal cavity comprising the mixer chamber where the engine exhaust gas is mixed with fluid spray exiting the injector, and wherein the injection chamber is positioned within the internal cavity between an upstream inlet baffle mounted to an inlet end of the mixer housing and a downstream outlet baffle mounted to an outlet end of the mixer housing.

11. A vehicle exhaust component assembly comprising:
a mixer outer housing defining an internal cavity and extending along a mixer center axis;
an upstream baffle positioned within the internal cavity;
a downstream baffle positioned within the internal cavity and spaced axially from the upstream baffle in a direction along the mixer center axis;
an injector mount held fixed relative to the mixer outer housing;
an injector mounted to the injector mount and configured to inject a fluid spray into the internal cavity in a first direction along an injection axis, wherein the injection axis is non-coaxial with the mixer center axis; and
an injection chamber positioned within the internal cavity between the upstream and downstream baffles, the injection chamber having a variable cross-section and extending from an inlet end to an outlet end that is open to the internal cavity, and wherein engine exhaust gas and spray from the injector enter the inlet end of the injection chamber to mix with each other prior to exiting the injection chamber via the outlet end in the first direction, and wherein the injection chamber has a narrowing body portion located downstream of the inlet end to accelerate flow during mixing.

12. The vehicle exhaust component assembly according to claim 11, wherein the injection chamber comprises a body having a length extending from the inlet end to the outlet end, wherein the injection chamber is defined by a first cross-sectional area at the inlet end and a second cross-sectional area along the length at a location that is downstream from the inlet end, and wherein the second cross-sectional area is less than the first cross-sectional area to define the narrowing body portion.

13. The vehicle exhaust component assembly according to claim 11, wherein the narrowing body portion is located between the inlet and outlet ends such that the injection chamber comprises a venturi shape.

14. The vehicle exhaust component assembly according to claim 11, wherein the narrowing body portion is located at the outlet end.

15. The vehicle exhaust component assembly according to claim 11, wherein the mixer outer housing has an inlet end that receives the engine exhaust gas and an outlet end via which a mixture of spray and exhaust gas exits the mixer housing, and wherein the inlet baffle is mounted to the inlet end and the outlet baffle is mounted to the outlet end, and wherein the inlet baffle comprises a first plate that includes a plurality of inlet openings that direct the engine exhaust gas into a mixer chamber, and wherein the outlet baffle comprises a second plate that includes one or more outlet openings that direct the mixture into a downstream exhaust component.

16. A method for injecting a fluid into an exhaust component comprising the steps of:
providing an injector to inject a fluid spray in a first direction along an injection axis and into an exhaust component defining a center axis, and wherein the injection axis is non-coaxial with the center axis;
positioning an injection chamber adjacent to the injector, the injection chamber having a variable cross-section and extending from an inlet end to an outlet end, and wherein engine exhaust gas and fluid spray from the injector enter the inlet end of the injection chamber to mix with each other prior to exiting the injection chamber via the outlet end in the first direction; and
forming a narrowing body portion in the injection chamber at a location downstream of the inlet end to accelerate flow during mixing.

17. The method according to claim 16, including forming the narrowing body portion at the outlet end.

18. The method according to claim 16, including forming the narrowing body portion between the inlet end and the outlet end.

19. A method for injecting a fluid into an exhaust component comprising the steps of:
- providing an injector to inject a fluid spray in a first direction along an injection axis and into an exhaust component defining a center axis;
- positioning an injection chamber adjacent to the injector, the injection chamber having a variable cross-section and extending from an inlet end to an outlet end, and wherein engine exhaust gas and fluid spray from the injector enter the inlet end of the injection chamber to mix with each other prior to exiting the injection chamber via the outlet end in the first direction;
- forming a narrowing body portion in the injection chamber at a location downstream of the inlet end to accelerate flow during mixing; and
- wherein the exhaust component comprises a mixer housing having an inlet end that receives the engine exhaust gas and an outlet end via which a mixture of spray and engine exhaust gas exits the mixer housing, and including mounting an inlet baffle to the inlet end and mounting an outlet baffle to the outlet end such that a mixer chamber is provided between the inlet and outlet baffles, and including positioning the injection chamber within the mixer chamber.

20. The method according to claim 19, wherein the inlet baffle comprises a first plate that includes a plurality of inlet openings that direct the engine exhaust gas into the mixer chamber, and wherein the outlet baffle comprises a second plate that includes one or more outlet openings that direct the mixture into a downstream exhaust component.

* * * * *